United States Patent
Lee (10) Patent No.: US 10,063,178 B2
(45) Date of Patent: Aug. 28, 2018

(54) METHOD AND APPARATUS FOR SYNCHRONIZING MDPS MOTOR AND MOTOR POSITION SENSOR

(71) Applicant: HYUNDAI MOBIS CO., LTD., Seoul (KR)

(72) Inventor: Jae Hyun Lee, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/496,674

(22) Filed: Apr. 25, 2017

(65) Prior Publication Data

US 2018/0013370 A1    Jan. 11, 2018

(30) Foreign Application Priority Data

Jul. 7, 2016  (KR) .................. 10-2016-0086366

(51) Int. Cl.
| | | |
|---|---|---|
| *G05B 19/408* | (2006.01) | |
| *H02P 25/03* | (2016.01) | |
| *B62D 5/04* | (2006.01) | |

(52) U.S. Cl.
CPC ............ *H02P 25/03* (2016.02); *B62D 5/0463* (2013.01); *B62D 5/04* (2013.01)

(58) Field of Classification Search
CPC .............................. B62D 5/0463; H02P 25/03

USPC .............................................. 318/632, 568.22
See application file for complete search history.

(56) References Cited

U.S. PATENT DOCUMENTS

| | | | | |
|---|---|---|---|---|
| 9,638,766 B2* | 5/2017 | Diaconu | .............. | G01R 33/077 |
| 2009/0258612 A1* | 10/2009 | Zhuang | .................... | H03C 5/00 |
| | | | | 455/110 |
| 2012/0173081 A1* | 7/2012 | Hsu | ...................... | B62D 5/0457 |
| | | | | 701/42 |

\* cited by examiner

*Primary Examiner* — Jorge L Carrasquillo
(74) *Attorney, Agent, or Firm* — Knobbe Martens Olson & Bear LLP (57) ABSTRACT

A method for synchronizing an MDPS motor and a motor position sensor may include: sequentially aligning, by a controller, a rotor of the MDPS motor by sequentially applying preset three-phase current pulses to the MDPS motor, the three-phase current pulses corresponding to one electrical-angle cycle of the rotor of the MDPS motor, and detecting an actual rotational position of the aligned rotor through the motor position sensor; determining a zero point rotational position of the rotor based on the actual rotational position; determining a reference rotational position of the rotor based on the actual rotational position and the number of pole pairs in the MDPS motor, and determining an offset rotational position of the rotor based on the actual rotational position and the reference rotational position; and correcting the zero point rotational position by adding the offset rotational position to the zero point rotational position.

13 Claims, 5 Drawing Sheets

| Electrical Angle (Abs.Angle Point) | Rotational Position (LSB) | UVW Pattern |
|---|---|---|
| 0° | 0 | 1 0 1 |
| 60° | 2731 | 1 0 0 |
| 120° | 5461 | 1 1 0 |
| 180° | 8192 | 0 1 0 |
| 240° | 10923 | 0 1 1 |
| 300° | 13659 | 0 0 1 |

| Pole Pair Loop | Electrical Angle | Mechanical Angle | segAngle$_{LSB}$ | refAngle$_{LSB}$ | errAngle$_{LSB}$ |
|---|---|---|---|---|---|
| 1 | 0° | 0° | 3761.1 | 3761.1 | 0.0 |
| | 60° | 15° | 4443.2 | 4443.8 | −0.6 |
| | 120° | 30° | 5134.3 | 5126.5 | 7.8 |
| | 180° | 45° | 5810.7 | 5809.1 | 1.6 |
| | 240° | 60° | 6501.1 | 6491.8 | 9.3 |
| | 300° | 75° | 7183.6 | 7145.5 | 9.1 |
| 2 | 0° | 90° | 7869.2 | 7857.1 | 12.0 |
| | 60° | 105° | 8553.7 | 8539.8 | 13.9 |
| | 120° | 120° | 9246.3 | 9222.5 | 23.8 |
| | 180° | 135° | 9922.8 | 9905.1 | 17.7 |
| | 240° | 150° | 10610.7 | 10587.8 | 22.9 |
| | 300° | 165° | 11289.8 | 11270.5 | 19.3 |
| 3 | 0° | 180° | 11971.0 | 11953.1 | 17.9 |
| | 60° | 195° | 12650.9 | 12635.8 | 15.1 |
| | 120° | 210° | 13337.8 | 13318.5 | 19.3 |
| | 180° | 225° | 14009.2 | 14001.1 | 8.1 |
| | 240° | 240° | 14693.7 | 14683.8 | 9.9 |
| | 300° | 255° | 15371.0 | 15366.5 | 4.5 |
| 4 | 0° | 270° | 16051.8 | 16049.1 | 2.7 |
| | 60° | 285° | 348.1 | 347.8 | 0.3 |
| | 120° | 300° | 1037.2 | 1030.5 | 6.7 |
| | 180° | 315° | 1711.7 | 1713.1 | −1.4 |
| | 240° | 330° | 2399.1 | 2395.8 | 3.3 |
| | 300° | 345° | 3079.0 | 3078.5 | 0.6 |

METHOD AND APPARATUS FOR SYNCHRONIZING MDPS MOTOR AND MOTOR POSITION SENSOR

CROSS-REFERENCES TO RELATED APPLICATIONS

The present application claims priority to Korean application number 10-2016-0086366, filed on Jul. 7, 2016, which is incorporated by reference in its entirety.

BACKGROUND OF THE INVENTION

The present invention relates to a method and apparatus for synchronizing an MDPS (Motor Driven Power Steering) motor and a motor position sensor, and more particularly, to a method and apparatus for synchronizing a rotational position of a rotor of an MDPS motor with a motor position sensor.

In general, the position of a three-phase brushless motor of a MDPS system must be accurately calculated in order to control the motor.

A stator of the three-phase brushless motor typically includes field poles and a frame, and the field poles are fixed to the frame through screws or bolts. Furthermore, a rotor of the three-phase brushless motor includes a permanent magnet in which N and S poles are repetitively formed.

For rotation of the rotor of the motor, rotating fields need to be successively formed. In order to form such successive rotating fields, a current applied to a three-phase coil disposed at a stator winding needs to be commutated at an appropriate time. For such commutation at an appropriate time, the position of the rotor must be accurately recognized. The commutation refers to an operation of changing the current direction of the motor stator coil such that the rotor can be rotated. For a smooth operation of the motor, the position of the rotor must be accurately matched with a commutation point of a phase current. Such an operation requires a motor position sensor for detecting the position of the rotor. In general, a hall sensor is used to detect the position of the rotor, the hall sensor having a potential difference that is changed according to a change of magnetic flux.

However, in order to detect the position of the rotor through the motor position sensor such as a hall sensor, a preceding operation is required to synchronize the initial rotational position of the motor with the motor position sensor. According to a conventional synchronization method, a line voltage of a counter electromotive force induced in a stator winding of a motor is measured with the motor rotated by an external force, and compared to an output pulse of the hall sensor, and an offset between a zero crossing point of the line voltage and a switching point of the output pulse of the hall sensor is calculated. Then, the offset is corrected to zero or subtracted from an output of the motor position sensor in a software manner, in order to perform synchronization.

However, since the conventional synchronization method requires a separate driving device for driving the motor and a separate measuring device for measuring the line voltage and the output voltage of the hall sensor, the cost is inevitably increased. Furthermore, an error which occurs during measurement degrades the control performance. Moreover, since an ECU and the motor need to be separated from each other in order to measure the line voltage and the output pulse of the hall sensor, the manufacturing process including separation, measurement and reassembly operations inevitably has inefficiency.

SUMMARY OF THE INVENTION

Embodiments of the present invention are directed to a method and apparatus for synchronizing an MDPS motor and a motor position sensor, which is capable of shortening the manufacturing time by removing separate measuring devices which had been required for an operation of synchronizing the initial rotational position of a motor and a motor position sensor, and removing errors which occur during measurement, thereby improving motor control performance.

In one embodiment, a method for synchronizing an MDPS (Motor Driven Power Steering) motor and a motor position sensor may include: sequentially aligning, by a controller, a rotor of the MDPS motor by sequentially applying preset three-phase current pulses to the MDPS motor, the three-phase current pulses corresponding to one electrical-angle cycle of the rotor of the MDPS motor, and detecting an actual rotational position of the aligned rotor through the motor position sensor; determining a zero point rotational position of the rotor based on the actual rotational position; determining a reference rotational position of the rotor based on the actual rotational position and the number of pole pairs in the MDPS motor, and determining an offset rotational position of the rotor based on the actual rotational position and the reference rotational position; and correcting the zero point rotational position by adding the offset rotational position to the zero point rotational position.

In the aligning of the rotor of the MDPS motor, the controller may repetitively detect the actual rotational position of the rotor by a preset number of times when the rotor is aligned, and store an average of the detected actual rotational position values.

In the aligning of the rotor of the MDPS motor, the one electrical-angle cycle may include six steps at which the electrical angle of the rotor is sequentially increased by 60°.

The aligning of the rotor of the MDPS motor may be repeated by the number of pole pairs.

In the determining of the zero point rotational position of the rotor, the controller may decide the zero point rotational position of the rotor by subtracting a rotational position value corresponding to an electrical angle of 120° from a first actual rotational position, among first to 6n-th actual rotational positions which are decided according to the order that the actual rotational positions are detected and stored.

The determining of the reference rotational position of the rotor may include: determining first to 6n-th reference rotational positions corresponding to the first to 6n-th actual rotational positions, based on the first actual rotational position and the number of pole pairs; setting differences between the first to 6n-th actual rotational positions and the first to 6n-th reference rotational positions to first to 6n-th error values, respectively; and setting an average of the maximum error value and the minimum error value, among the first to 6n-th error values, to the offset rotational position.

The method may further include determining, by the controller, a hysteresis compensation rotational position based on preset hysteresis information of the motor position sensor, and performing hysteresis compensation by adding the hysteresis compensation rotational position to the offset-corrected zero point rotational position.

The method may further include resetting, by the controller, the motor position sensor to the hysteresis-compensated zero point rotational position.

In another embodiment, an apparatus for synchronizing an MDPS motor and a motor position sensor may include: a motor position sensor configured to detect a rotational position of an MDPS motor; and a controller configured to sequentially align a rotor of the MDPS motor by sequentially applying preset three-phase current pulses to the MDPS motor, the three-phase current pulses corresponding to one electrical-angle cycle of the rotor in the MDPS motor, and detect an actual rotational position of the aligned rotor through the motor position sensor, configured to decide a zero point rotational position of the rotor based on the actual rotational position, configured to decide a reference rotational position of the rotor based on the actual rotational position and the number of pole pairs in the MDPS motor, and decide an offset rotational position of the rotor based on the actual rotational position and the reference rotational position, and configured to correct the zero point rotational position by adding the offset rotational position to the zero point rotational position.

When the rotor is aligned, the controller may repetitively detect the actual rotational position of the rotor by a preset number of times, and store an average of the detected actual rotational position values.

The one electrical-angle cycle may include six steps at which the electrical angle of the rotor is sequentially increased by 60°, and the controller may repetitively detect and store the actual rotational position of the aligned rotor by the number of pole pairs during one electrical-angle cycle.

The controller may decide the zero point rotational position of the rotor by subtracting a rotational position value corresponding to an electrical angle of 120° from a first actual rotational position, among first to 6n-th actual rotational positions which are decided according to the order that the actual rotational positions are detected and stored.

The controller may decide first to 6n-th reference rotational positions corresponding to the first to 6n-th actual rotational positions, based on the first actual rotational position and the number of pole pairs, set differences between the first to 6n-th actual rotational positions and the first to 6n-th reference rotational positions to first to 6n-th error values, and set an average of the maximum error value and the minimum error value, among the first to 6n-th error values, to the offset rotational position.

The controller may decide a hysteresis compensation rotational position based on preset hysteresis information of the motor position sensor, and performs hysteresis compensation by adding the hysteresis compensation rotational position to the offset-corrected zero point rotational position.

The controller may reset the motor position sensor to the hysteresis-compensated zero point rotational position.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
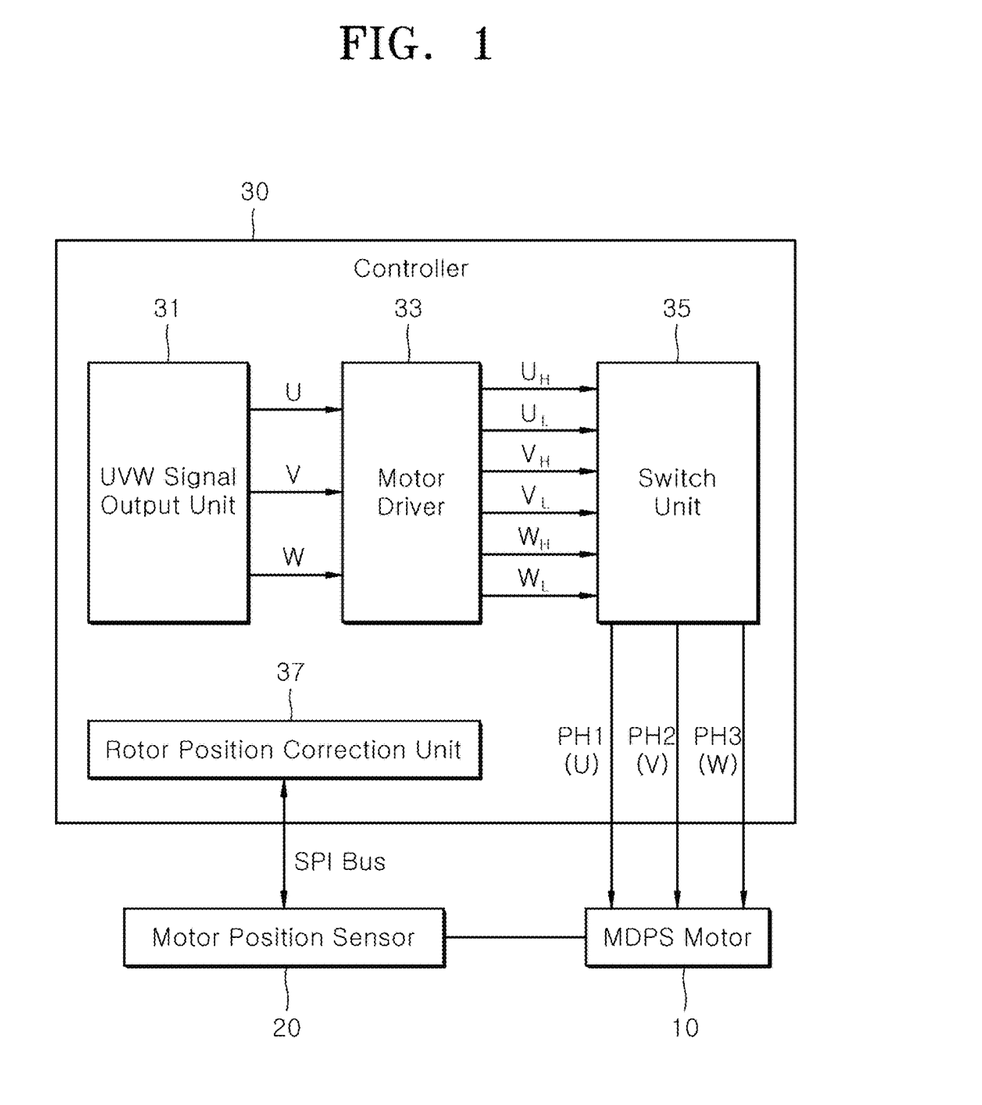
FIG. 1 is a block configuration diagram illustrating an apparatus for synchronizing an MDPS motor and a motor position sensor in accordance with an embodiment of the present invention.
Figure 2A:
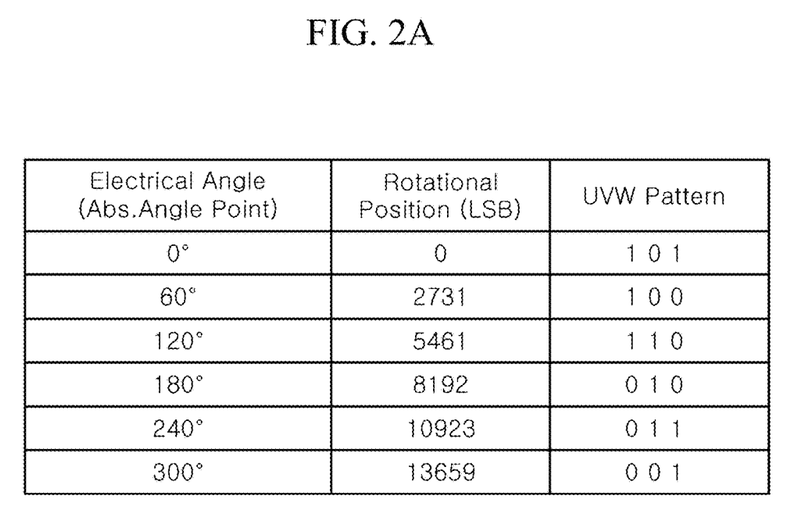
FIG. 2A is a UVW table set in a controller of the apparatus for synchronizing an MDPS motor and a motor position sensor in accordance with the embodiment of the present invention.
Figure 2B:
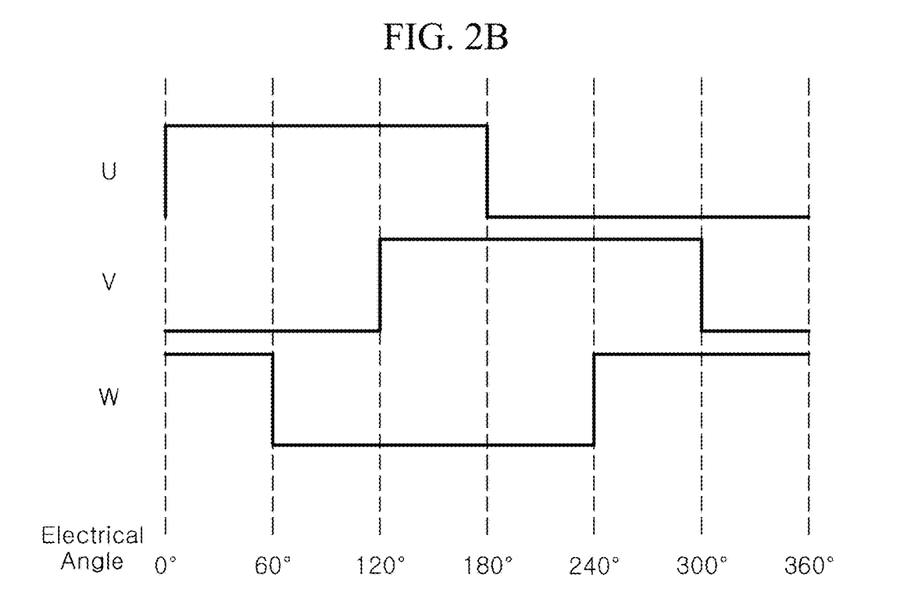
FIG. 2B is a diagram illustrating the waveforms of UVW signals.

FIG. 1 is a block configuration diagram illustrating an apparatus for synchronizing an MDPS motor and a motor position sensor in accordance with an embodiment of the present invention. FIG. 2A is a UVW table set in a controller of the apparatus for synchronizing an MDPS motor and a motor position sensor in accordance with the embodiment of the present invention. FIG. 2B is a diagram illustrating the waveforms of UVW signals.

Referring to FIG. 1, the apparatus for synchronizing an MDPS motor and a motor position sensor in accordance with the embodiment of the present invention may include an MDPS motor 10, a motor position sensor 20 and a controller 30. The controller 30 may include a UVW signal output unit 31, a motor driver 33, a switch unit 35 and a rotor position correction unit 37.

First, a UVW signal will be described. The UVW signal is an output signal of the motor position sensor 20 which measures a rotational position of a motor rotor in a state where a control device divides an electrical angle of the rotor into six sectors. FIG. 2A shows the corresponding relation between an electrical angle of the motor rotor and U, V and W outputs of the motor position sensor 20. Specifically, the electrical angle of the rotor may be divided into six sectors in the range of 0° to 360° for one pole pair. That is, each sector corresponds to 60°. When the electrical angle of the rotor is included in the first sector of 0° to 60°, the U, V and W outputs of the motor position sensor 20 may become 1, 0 and 1, and when the electrical angle of the rotor is included in the second sector of 60° to 120°, the U, V and W outputs of the motor position sensor 20 may become 1, 0 and 0. Typically, the control device such as an ECU may receive a UVW signal from the motor position sensor 20, the UVW signal having waveforms as illustrated in FIG. 2B, determine in which sector the electrical angle of the rotor is included, and apply a three-phase current corresponding to the received UVW signals to the motor, in order to perform commutation control. FIG. 2A shows the corresponding relation between an electric angle of the rotor and U, V and W outputs of the motor position sensor 20.

The apparatus in accordance with the present embodiment may detect the initial rotational position where the rotor is aligned, according to a UVW signal (1, 0, 1) corresponding to an electrical angle of 0°, calculate a zero point rotational position based on the detected rotational position, calculate the final zero point of the rotor through offset and hysteresis correction processes, and reset the motor position sensor 20, thereby synchronizing the MDPS motor 10 and the motor position sensor 20.

For this operation, the apparatus in accordance with the present embodiment may not receive a UVW signal from the motor position sensor 20, but preset the same UVW signal as an actual UVW signal pattern outputted from the motor position sensor 20, and apply a three-phase current corresponding to the preset UVW signal to the MDPS motor 10, in order to detect the rotational position of the rotor. At this time, the apparatus may repetitively detect the rotational position of the rotor and correct the offset and hysteresis characteristics, thereby improving the accuracy of the operation of synchronizing the MDPS motor 10 and the motor position sensor 20. The operation of detecting the rotational position of the rotor may be performed by the number of times corresponding to six steps constituting one electrical-angle cycle and the number of pole pairs.

Referring to the above-described configuration and FIG. 1, the operation of the apparatus for synchronizing an MDPS motor and a motor position sensor in accordance with the embodiment of the present invention will be described.

The UVW signal output unit 31 may output a preset UVW signal to the motor driver 33, the UVW signal corresponding to one electrical-angle cycle of the rotor in the MDPS motor 10. That is, as shown in FIG. 2A, UVW signals corresponding to electrical angles of the rotor may be sequentially outputted to the motor driver 33. As shown in FIG. 2A, the UVW signal output unit 31 may store mapping information between the electrical angles of the rotor and the UVW signals as a lookup table. Thus, the UVW signal output unit 31 may transmit a UVW signal, which is initially set to (1, 0, 1), as three pulse signals to the motor driver 33.

The motor driver 33 may generate six switch control signals based on the received UVW signal, and transmit the generated switch control signals to six transistors (not illustrated) constituting the switch unit 35, respectively. The six transistors may be turned on/off in response to the six switch control signals, respectively, and supply three-phase current pulses to the MDPS motor 10. The process of outputting the three-phase current pulses through the switch unit 35 constituted by the transistors, based on the UVW signal, may be easily understood by those skilled in the art to which the present invention pertains. Thus, the detailed descriptions thereof are omitted herein.

In the present embodiment, the UVW signal output unit 31, the motor driver 33 and the switch unit 35 are separately configured inside the controller 30. Depending on embodiments, however, the UVW signal output unit 31, the motor driver 33 and the switch unit 35 may be integrated as one component inside the controller 30.

When the three-phase current pulses are applied to the MDPS motor 10 or specifically three-phase stator windings of the MDPS motor 10, a static magnetic field may be generated. Thus, the rotor may be aligned at a specific position according to the static magnetic field generated by the stator. Until the rotor is aligned and stopped at a specific position by the static magnetic field, a time of one second or less may be required depending on the specification of the MDPS motor 10, such as the mass of the rotor. This indicates that a predetermined waiting time may be needed before the motor position sensor 20 detects an actual rotational position of the rotor.

When the rotor is aligned and stopped at the specific position according to the static magnetic field, the motor position sensor 20 may detect the rotational position of the rotor. The sensor for detecting a rotational position of the rotor may include a resolver, an encoder or a rotary sensor. In the present embodiment, the rotary sensor may be used as the motor position sensor 20, but the motor position sensor 20 is not limited thereto.

The rotor position correction unit 37 may detect the actual rotational position of the rotor aligned at the specific position through the motor position sensor 20. The motor position sensor 20 which can be embodied by a rotary sensor may detect a rotational position of the rotor using a resolution of 14 bits. That is, the motor position sensor 20 may detect the rotational position of the motor using a resolution of $2^{14}$. For example, an output of the motor position sensor 20, corresponding to a mechanical angle of 360° in the rotor, is 11111111111111. When the output of 11111111111111 is converted into a decimal number, the result is $16384(=2^{14})$. Thus, a value corresponding to a mechanical angle of 1° in the rotor becomes 45.5(=16384/365). Here, a value obtained by converting a 14-bit output of the motor position sensor 20 into a decimal number, for example, the value of 16384 or 45.5 is represented by LSB. The rotor position correction unit 37 may store the actual rotational position of the rotor, detected through the motor position sensor 20, as an LSB value. When the motor position sensor 20 is embodied by a rotary sensor, an output of the rotary sensor may be transmitted to the rotor position correction unit 37 through SPI (Serial Peripheral Interface) bus (MISO).

However, the 14-bit output of the motor position sensor 20 is only an example for promoting understanding of the present embodiment, and the present invention is not limited thereto. The output of the motor position sensor 20 may include a different number of bits depending on the resolution and specification of the motor position sensor 20, and is not limited to a binary output.

At this time, when the rotor is aligned at a specific position, the rotor position correction unit 37 may repetitively detect an actual rotational position of the rotor by a preset number of times, and store an average of the detected actual rotational position values. The above-described process can minimize noise which is generated during the process of detecting a rotational position of the rotor, thereby increasing the accuracy of the rotational position detection. Furthermore, the process can minimize a rotational position measurement error caused by minute vibration of the rotor. When the preset number of times is raised, the accuracy of the rotational position detection for the rotor can be improved, but the time required for measuring a rotational position may be increased. Thus, the preset number of times may be set to 1,000.

The above-described process may be summarized as follows. The UVW signal output unit 31 may output the initial UVW signal set to (1, 0, 1) to the motor driver 33, and the motor driver 33 may output the switch control signals to the switch unit 35. Then, as the three-phase current pulses are applied to the MDPS motor 10 through the switch unit 35, a static magnetic field may be generated, and the rotor may be aligned at a specific position according to the static magnetic field. The rotor position correction unit 37 may repetitively detect an actual rotational position of the rotor by a predetermined number of times through the motor position sensor 20, and store an average of the detected rotational positions. This process corresponds to a first step of one electrical-angle cycle for one pole pair, and is repeated 6n times (=step number (6) of the electrical-angle cycle*pole pair number (n)), while the UVW signal is sequentially varied and outputted by the UVW signal output unit 31.

When the 6n cycles are ended, the rotor position correction unit 37 may store 6n actual rotational positions of the rotor. The rotor position correction unit 37 may store the 6n actual rotational positions in array. Hereafter, in order to distinguish the terms, the 6n actual rotational positions are defined as first to 6n-th actual rotational positions, according to the order in which the actual rotational positions are detected and stored.

The rotor position correction unit 37 may decide the zero point rotational position of the rotor, based on the actual rotational position. The first actual rotational position is a rotational position of the rotor, corresponding to an electrical angle of 0°, in the initial pole pair loop. In principle, the first actual rotational position may be set to the zero point rotational position of the rotor. However, when the controller 30 rotates the rotor of the MDPS motor by controlling commutation through a three-phase current, the controller 30 needs to perform commutation at an electrical angle of 120° before the rotational position of the rotor. Thus, the controller 30 may decide a rotational position to the zero point rotational position, the rotational position corresponding to an electrical angle of 120° before the position of the rotor which is aligned at the specific position according to the applied three-phase current pulse, and reset the motor rotation sensor. Thus, the rotor position correction unit 37 may decide the zero point rotational position by subtracting a rotational position value LSB corresponding to an electrical angle of 120° from the first actual rotational position, as expressed by Equation 1 below.

$$zeroAngle_{LSB} = segAngle_{LSB}[0] - \frac{2^{14}}{n \times 3} \quad \text{[Equation 1]}$$

In Equation 1, $zeroAngle_{LSB}$ represents the zero point rotational position, $segAngle_{LSB}[0]$ represents the first actual rotational position, and n represents the number of pole pairs.

In Equation 1, $2^{14}/(n*3)$ indicates a rotational position LSB corresponding to an electrical angle of 120°. That is, a mechanical angle corresponding to the electrical angle of 120° is 120°/n. When a proportional expression of (360°: $2^{14}$=120°/n:x) is established to calculate the rotational position LSB corresponding to the mechanical angle of 120°/n, the rotational position LSB corresponding to the electrical angle of 120° may be set to $2^{14}/(n*3)$. Therefore, the zero point rotational position may be decided according to Equation 1.

The rotor position correction unit 37 may decide a reference rotational position of the rotor based on the actual rotational position and the pole pair number n, and decide an offset rotation position for correcting the zero point rotational position based on the actual rotational position and the reference rotational position.

More specifically, the rotor position correction unit 37 may set first to 6n-th reference rotational positions corresponding to the first to 6n-th actual rotational positions, respectively, based on the first rotational position and the pole pair number n. The first to 6n-th reference rotational positions may indicate normal rotational positions of the rotor, which are theoretically detected during 6n cycles in which the actual rotational position of the rotor is detected.

The first to 6n-th reference rotational positions may be decided according to Equation 2.

$$refAngle_{LSB}[0 \ldots 6n-1] = segAngle_{LSB}[0] + \frac{2^{14}}{n \times 6}i, \quad \text{[Equation 2]}$$
$$i = 0 \ldots 6n-1$$

In Equation 2, $refAngle_{LSB}[0 \ldots 6n-1]$ represent the first to 6n-th reference rotational positions, $segAngle_{LSB}[0]$ represents the first actual rotational position, and n represents the number of pole pairs.

The rotor position correction unit 37 may set differences between the first to 6n-th actual rotational positions and the first to 6n-th reference rotational positions to first to 6n-th error values, respectively, as expressed by Equation 3 below.

$$errAngle_{LSB}[0 \ldots 6n-1] = segAngle_{LSB}$$
$$[0 \ldots 6n-1] - refAngle_{LSB}[0 \ldots 6n-1] \quad \text{[Equation 3]}$$

In Equation 3, $errAngle_{LSB}[0 \ldots 6n-1]$ represent the first to 6n-th error values, $segAngle_{LSB}[0 \ldots 6n-1]$ represent the first to 6n-th actual rotational positions, and $refAngle_{LSB}[0 \ldots 6n-1]$ represent the first to 6n-th reference rotational positions.

The rotor position correction unit 37 may set an average between the maximum error value and the minimum error value, among the first to 6n-th error values, to an offset rotational position for correcting the zero point rotational position. As the average between the maximum error value and the minimum error value is set to the offset rotational position, errors which occur while the rotor is rotated by the mechanical angle of 360° may exhibit a symmetrical distribution, which makes it possible to improve the accuracy of the operation for determining the rotational position of the rotor. The offset rotational position may be decided according to Equation 4 below.

$$offsetAngle_{LSB} = \frac{\max(errAngle_{LSB}[\ldots]) + \min(errAngle_{LSB}[\ldots])}{2} \quad \text{[Equation 4]}$$

In Equation 4, $offsetAngle_{LSB}$ represents the offset rotational position, $\max(errAngle_{LSB}[\ldots])$ represents the maximum error value, and $\min(errAngle_{LSB}[\ldots])$ represents the minimum error value.

The rotor position correction unit 37 may correct the zero point rotational position by adding the offset rotational position to the zero point rotational position. The offset correction can minimize an INL (Integrated Non Linearity) error which may occur while the motor rotation sensor detects a rotational position of the rotor, that is, an error between a normal sensor output and an actual sensor output.

The rotor position correction unit 37 may reflect the hysteresis characteristic of the motor position sensor 20 in order to precisely correct the zero point rotational position. That is, the rotor position correction unit 37 may decide a hysteresis compensation rotational position based on preset hysteresis information of the motor position sensor 20, and compensate for the hysteresis characteristic by adding the hysteresis compensation rotational position to the offset-corrected zero rotational position. The hysteresis compensation rotational position may be decided according to Equation 5.

$$compHyst_{LSB} = \frac{HystSetting_{LSB}}{2} \quad \text{[Equation 5]}$$

In Equation 5, $compHyst_{LSB}$ represents a hysteresis compensation rotational position, and $HystSetting_{LSB}$ represents preset hysteresis information.

The final zero point rotational position of the rotor, obtained by reflecting the offset and hysteresis characteristics, may be decided according to Equation 6.

$$zeroAngleCorr_{LSB} = zeroAngle_{LSB} + offsetAngle_{LSB} + compHyst_{LSB} \quad \text{[Equation 6]}$$

In Equation 6, $zeroAngleCorr_{LSB}$ represents the final zero point rotational position obtained by reflecting the offset and hysteresis characteristics, $zeroAngle_{LSB}$ represents the zero point rotational position, $offsetAngle_{LSB}$ represents the offset rotational position, and $compHyst_{LSB}$ represents the hysteresis compensation rotational position.

Equations 1 to 6 are based on the motor position sensor 20 having a resolution of 14 bits in accordance with the present embodiment, and the parameters used in Equations 1 to 6 may be variably set depending on the resolution and specification of the motor position sensor 20.

The rotor position correction unit 37 may reset the motor position sensor 20 to the zero point rotational position into which the offset and hysteresis characteristics are reflected. That is, the rotor position correction unit 37 may finally set the zero point rotational position of the rotor of the MDPS motor 10 to the motor position sensor 20. Then, the synchronization operation may be ended. When the motor position sensor 20 is embodied by the above-described rotary sensor, the rotor position correction unit 37 may input the initial rotational position of the rotor to the rotary sensor through the SPI bus (MOSI).

Figure 3:
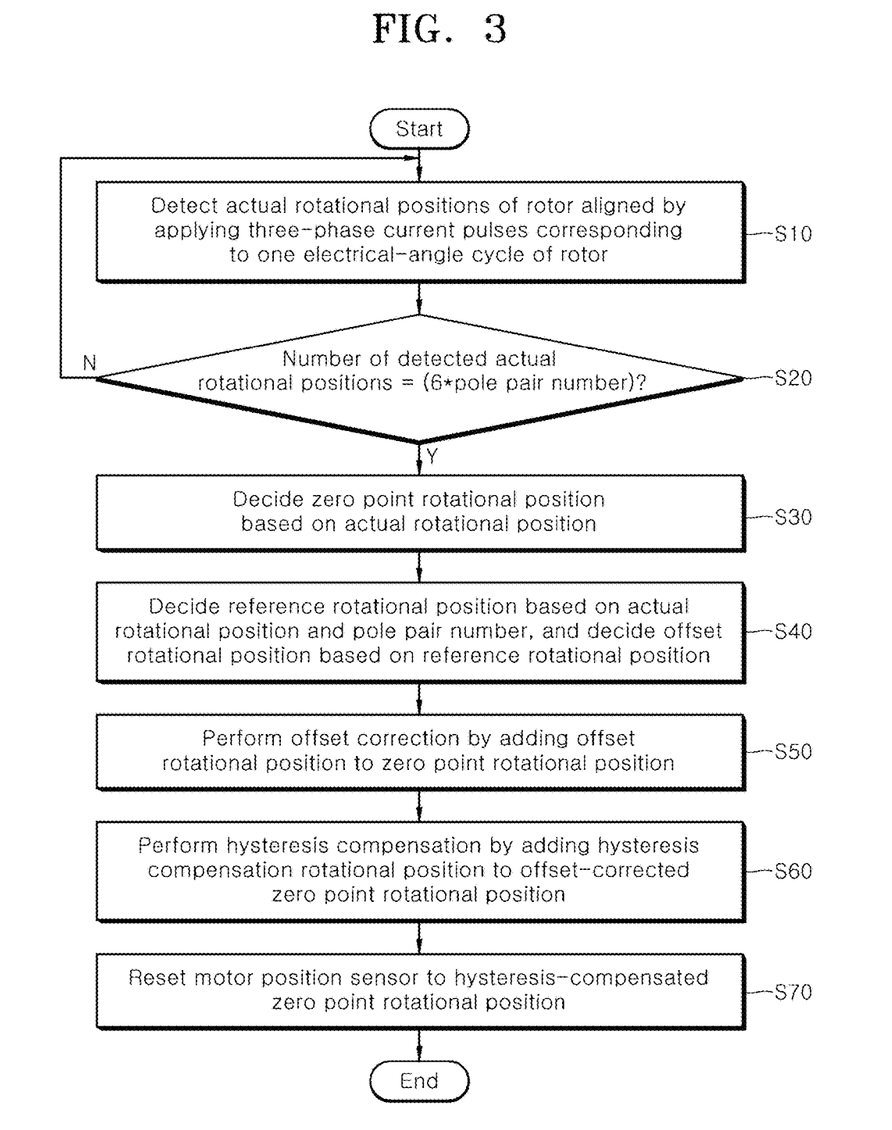
FIG. 3 is a flowchart illustrating a method for synchronizing an MDPS motor and a motor position sensor in accordance with an embodiment of the present invention.
Figure 4:
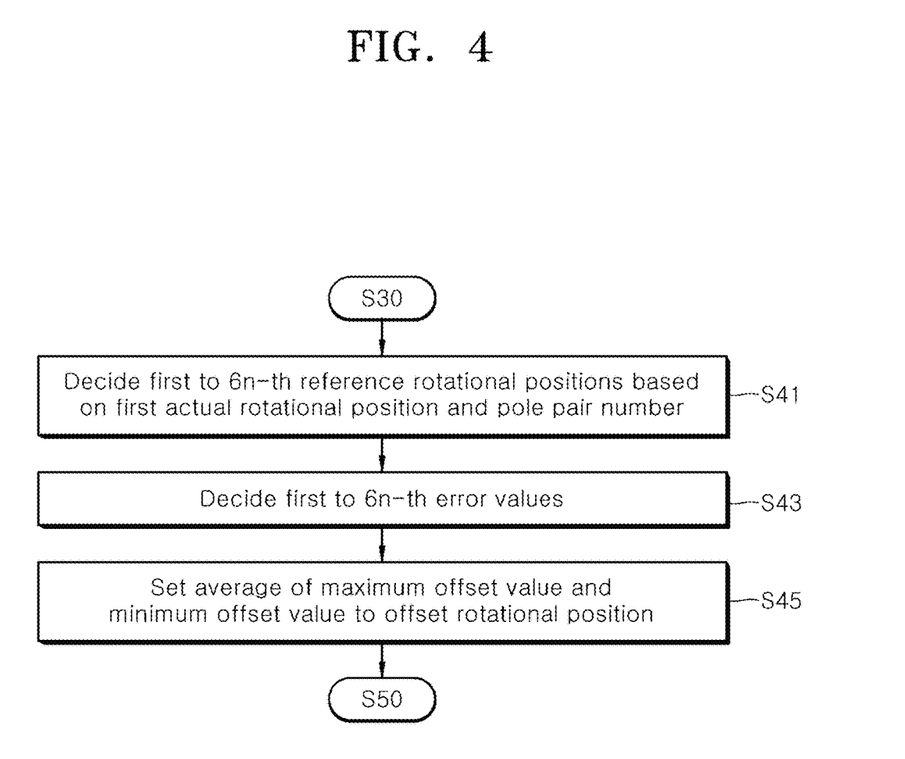
FIG. 4 is a flowchart illustrating a step of setting an offset rotational position of the rotor in the method for synchronizing an MDPS motor and a motor position sensor in accordance with the embodiment of the present invention.

FIG. 3 is a flowchart illustrating a method for synchronizing an MDPS motor and a motor position sensor in accordance with an embodiment of the present invention. FIG. 4 is a flowchart illustrating a step of setting an offset rotational position of the rotor in the method for synchronizing an MDPS motor and a motor position sensor in accordance with the embodiment of the present invention.

Referring to FIGS. 3 and 4, the method for synchronizing an MDPS motor and a motor position sensor in accordance with the embodiment of the present invention will be described. First, the controller 30 may sequentially align the rotor by sequentially applying preset three-phase current pulses to the MDPS motor 10, the three-phase current pulses corresponding to one electrical-angle cycle of the rotor of the MDPS motor, and detect actual rotational positions of the aligned rotor through the motor position sensor 20, at step S10.

At this time, when the rotor is aligned, the controller 30 may repetitively detect an actual rotational position of the rotor by a preset number of times, and store an average of the detected actual rotational position values.

One electrical-angle cycle may include six steps at which the electrical angle of the rotor is sequentially increased by 60°.

Step S10 may be repetitively performed by the number n of pole pairs in the MDPS motor 10. Thus, the process of detecting the actual rotational position of the rotor aligned through the three-phase current pulses may be repeated 6n times at step S20.

When the 6n actual rotational position detection processes are ended, the controller 30 may decide the zero point rotational position of the rotor by subtracting a rotational position value corresponding to an electrical angle of 120° from a first actual rotational position, among th first to 6n-th actual rotational positions which are decided according to the order that the actual rotational positions are detected and stored, at step S30. As described above, the zero point rotational position may be decided according to Equation 1.

Then, the controller 30 may decide a reference rotational position of the rotor based on the actual rotational position and the number n of pole pairs in the MDPS motor 10, and decide an offset rotational position of the rotor based on the actual rotational position and the reference rotational position, at step S40.

Specifically, the controller 30 may decide first to 6n-th reference rotational positions corresponding to the first to 6n-th actual rotational positions, based on the first rotational position and the pole pair number n, at step S41. As described above, the reference rotational positions may be decided according to Equation 2.

The controller 30 may set differences between the first to 6n-th actual rotational positions and the first to 6n-th reference rotational positions to first to 6n-th error values at step S43. As described above, the error values may be decided according to Equation 3.

The controller 30 may set an average of the maximum error value and the minimum error value among the first to 6n-th error values to the offset rotational position, at step S45. As described above, the offset rotational position may be decided according to Equation 4.

The controller 30 may correct the zero point rotational position by adding the offset rotational position to the zero point rotational position, at step S50.

The controller 30 may decide a hysteresis compensation rotational position based on preset hysteresis information of the motor position sensor 20, and correct the hysteresis characteristic by adding the hysteresis compensation rotational position to the offset-corrected zero rotational position, at step S60.

Then, the controller 30 may reset the motor position sensor 20 to the hysteresis-corrected zero point rotational position at step S70.

Figure 5:
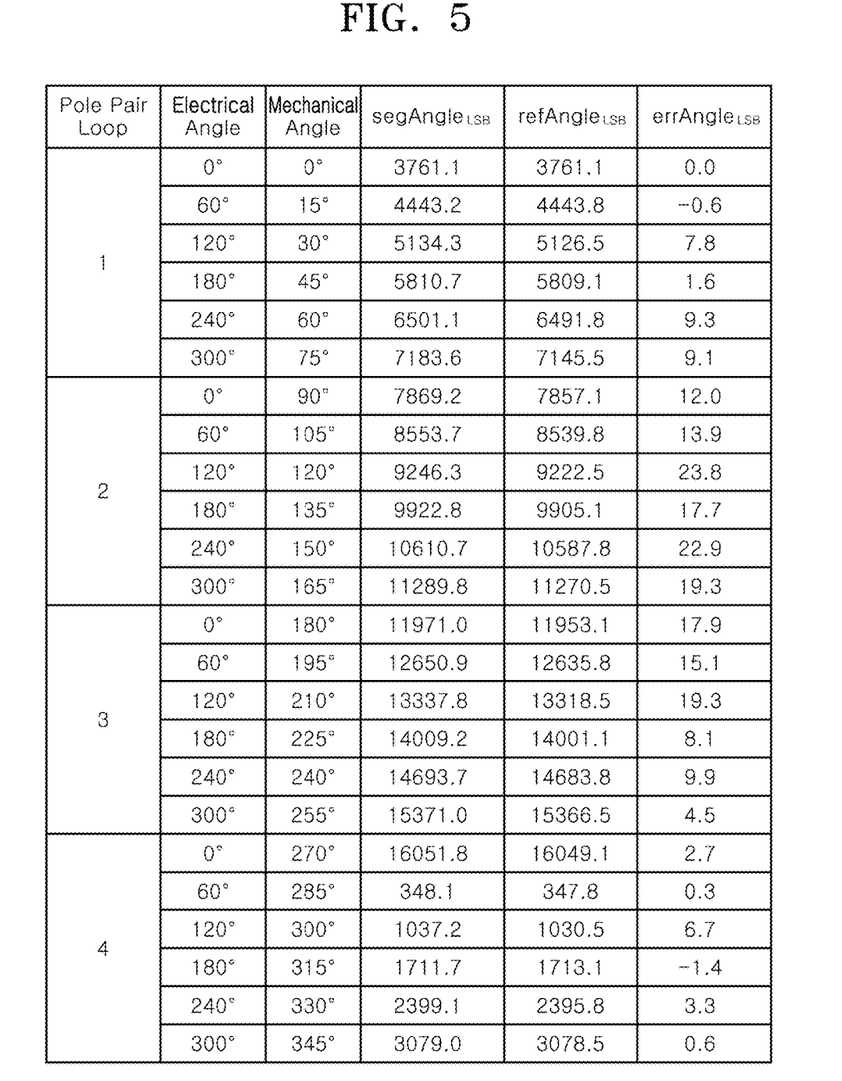
FIG. 5 is a table for describing a process of performing a synchronization operation by applying the method for synchronizing an MDPS motor and a motor position sensor in accordance with the embodiment of the present invention.

FIG. 5 is a table for describing a process of performing a synchronization operation by applying the method for synchronizing an MDPS motor and a motor position sensor in accordance with the embodiment of the present invention. Referring to FIG. 5, the process of performing a synchronization operation by applying the method for synchronizing an MDPS motor and a motor position sensor in accordance with the embodiment of the present invention will be described in detail.

Here, the MDPS motor 10 of which the rotor has an eight-pole permanent magnet including four pole pairs and the motor position sensor 20 having a resolution of 14 bits are exemplified. Since the number of pole pairs is four, a process of detecting and storing an actual rotational position of the aligned rotor may be repeated four times during one electrical-angle cycle. Thus, a total of 24 actual rotational positions may be detected and stored in the controller 30. FIG. 5 shows that rotational positions based on electrical angles and mechanical angles are expressed as LSB values. In FIG. 5, $segAngle_{LSB}$ represents first to 24th actual rotational positions, $refAngle_{LSB}$ represents first to 24th reference rotational positions, and $errAngle_{LSB}$ represents first to 24th error values.

The zero point rotational position may be decided by subtracting a rotational position LSB corresponding to an electrical angle of 120° from the first actual rotational position. When the first actual rotational position of 3761.1 is substituted for Equation 1, the zero point rotational position may be set to 2395.8.

The first to 24th reference rotational positions may be decided according to Equation 2 based on the first actual rotational position and the number of pole pairs, and the first to 24th error values may be decided according to Equation 3. The values are shown in the table of FIG. 5.

Therefore, the offset rotational position may be decided according to Equation 4. Since the maximum error value is 23.8 and the minimum error value is −1.4, the offset rotational position may be set to 11.2.

The hysteresis compensation rotational position may be decided according to Equation 5. Under the supposition that the hysteresis information of the motor rotation sensor is set to 16, the hysteresis compensation rotational position may be set to 8 according to Equation 5.

Therefore, when the offset and hysteresis characteristics are reflected into the zero point rotational position, that is, when the zero point rotational position, the offset rotational position and the hysteresis compensation rotational position are added up, 2415 may be calculated as the final zero point rotational position of the rotor. The controller 30 may reset the motor position sensor 20 by setting the final zero point rotational position of 2415 to the motor position sensor 20. More specifically, the final zero point rotational position calculated as an LSB value of 2415 may be set as 14 bits to the motor positional sensor through the SPI bus (MOSI).

In accordance with the present embodiment, while a plurality of measuring devices required for synchronizing the initial rotational position of the MDPS motor with the motor position sensor are removed, the logic for resetting the motor position sensor by determining the zero point rotational position of the rotor in the MDPS motor may be applied. Thus, the manufacturing time and cost can be reduced, and errors measured during synchronization can be removed to accomplish an effect of improving the motor control performance.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for synchronizing an MDPS (Motor Driven Power Steering) motor and a motor position sensor, comprising:
sequentially aligning, by a controller, a rotor of the MDPS motor by sequentially applying preset three-phase current pulses to the MDPS motor, the three-phase current pulses corresponding to one electrical-angle cycle of the rotor of the MDPS motor, and detecting an actual rotational position of the aligned rotor through the motor position sensor;
determining a zero point rotational position of the rotor based on the actual rotational position;
determining a reference rotational position of the rotor based on the actual rotational position and the number of pole pairs of the MDPS motor, and determining an offset rotational position of the rotor based on the actual rotational position and the reference rotational position; and
correcting the zero point rotational position by adding the offset rotational position to the zero point rotational position
wherein determining the reference rotational position of the rotor comprises:
determining first to 6n-th reference rotational positions corresponding to first to 6n-th actual rotational positions, based on the first actual rotational position and the number of pole pairs,
setting differences between the first to 6n-th actual rotational positions and the first to 6n-th reference rotational positions to first to 6n-th error values, respectively, and
setting an average of the maximum error value and the minimum error value, among the first to 6n-th error values, to the offset rotational position.

2. The method of claim 1 wherein in the aligning of the rotor of the MDPS motor, the controller repetitively detects the actual rotational position of the rotor by a preset number of times when the rotor is aligned, and stores an average of the detected actual rotational position values.

3. The method of claim 2, wherein in the aligning of the rotor of the MDPS motor, the one electrical-angle cycle comprises six steps at which the electrical angle of the rotor is sequentially increased by 600.

4. The method of claim 3, wherein the aligning of the rotor of the MDPS motor is repeated by the number of pole pairs.

5. The method of claim 4, wherein in the determining of the zero point rotational position of the rotor, the controller decides the zero point rotational position of the rotor by subtracting a rotational position value corresponding to an electrical angle of 1200 from a first actual rotational position, among first to 6n-th actual rotational positions which are decided according to the order that the actual rotational positions are detected and stored.

6. The method of claim 1, further comprising determining, by the controller, a hysteresis compensation rotational position based on preset hysteresis information of the motor position sensor, and performing hysteresis compensation by adding the hysteresis compensation rotational position to the offset-corrected zero point rotational position.

7. The method of claim 6, further comprising resetting, by the controller, the motor position sensor to the hysteresis-compensated zero point rotational position.

8. An apparatus for synchronizing an MDPS motor and a motor position sensor, comprising:
a motor position sensor configured to detect a rotational position of an MDPS motor; and
a controller configured to sequentially align a rotor of the MDPS motor by sequentially applying preset three-phase current pulses to the MDPS motor, the three-phase current pulses corresponding to one electrical-angle cycle of the rotor in the MDPS motor, and detect an actual rotational position of the aligned rotor through the motor position sensor, configured to determine a zero point rotational position of the rotor based on the actual rotational position, configured to determine a reference rotational position of the rotor based on the actual rotational position and the number of pole pairs of the MDPS motor, and determine an offset rotational position of the rotor based on the actual rotational position and the reference rotational position, and configured to correct the zero point rotational position by adding the offset rotational position to the zero point rotational position
wherein the controller is configured to
determine first to 6n-th reference rotational positions corresponding to first to 6n-th actual rotational positions, based on the first actual rotational position and the number of pole pairs, set differences between the first to 6n-th actual rotational positions and the first to 6n-th reference rotational positions to first to 6n-th error values, and set an average of the maximum error value and the minimum error value, among the first to 6n-th error values, to the offset rotational position.

9. The apparatus of claim 8, wherein when the rotor is aligned, the controller repetitively detects the actual rotational position of the rotor by a preset number of times, and stores an average of the detected actual rotational position values.

10. The apparatus of claim 9, wherein the one electrical-angle cycle comprises six steps at which the electrical angle of the rotor is sequentially increased by 600 and the controller repetitively detects and stores the actual rotational position of the aligned rotor by the number of pole pairs during one electrical-angle cycle.

11. The apparatus of claim 10, wherein the controller decides the zero point rotational position of the rotor by subtracting a rotational position value corresponding to an electrical angle of 120° from a first actual rotational position, among first to 6n-th actual rotational positions which are decided according to the order that the actual rotational positions are detected and stored.

12. The apparatus of claim 8, wherein the controller decides a hysteresis compensation rotational position based on preset hysteresis information of the motor position sensor, and performs hysteresis compensation by adding the hysteresis compensation rotational position to the offset-corrected zero point rotational position.

13. The apparatus of claim 12, wherein the controller resets the motor position sensor to the hysteresis-compensated zero point rotational position.

* * * * *